United States Patent [19]

Hlavaty et al.

[11] Patent Number: 5,364,252
[45] Date of Patent: Nov. 15, 1994

[54] GAS INJECTOR WITH RETRACTABLE NOZZLE FOR ASSIST OF PLASTICS INJECTION MOLDING

[75] Inventors: David G. Hlavaty, Allen Park; Suresh D. Shah, Rochester Hills; David E. Compeau, Oxford, all of Mich.

[73] Assignee: General Motors Corporation, Detroit, Mich.

[21] Appl. No.: 935,315

[22] Filed: Aug. 26, 1992

[51] Int. Cl.⁵ .................. B29L 45/00; B29L 45/34; B29D 22/00
[52] U.S. Cl. .................. 425/3; 264/328.12; 264/328.13; 264/572; 425/533; 425/546; 425/812; 425/536
[58] Field of Search .................. 425/3, 130, 562, 563, 425/564, 566, 546, 812, 536; 264/572, 328.12, 328.13; 355/179, 229; 324/208

[56] References Cited

U.S. PATENT DOCUMENTS

| | | | |
|---|---|---|---|
| 2,915,681 | 12/1959 | Troy | 335/229 |
| 3,174,181 | 3/1965 | Langecker | 425/522 |
| 3,253,098 | 5/1966 | Perry | 335/179 |
| 3,443,585 | 5/1969 | Reinicke | 335/229 |
| 3,606,171 | 9/1971 | Voelker | 239/587.1 |
| 3,683,239 | 8/1972 | Sturman | 335/179 |
| 3,755,766 | 8/1973 | Read, Jr. | 335/229 |
| 3,887,312 | 6/1975 | Seary | 425/3 |
| 3,934,816 | 1/1976 | Terrell et al. | 335/229 |
| 4,064,210 | 12/1977 | Kellogg | 264/523 |
| 4,106,887 | 8/1978 | Yasuike et al. | 425/566 |
| 4,131,665 | 12/1978 | Bodson et al. | 264/572 |
| 4,676,730 | 6/1987 | Yamasaki | 425/569 |
| 4,740,150 | 4/1988 | Sayer | 425/542 |
| 4,824,732 | 4/1989 | Hendry et al. | 428/542.8 |
| 4,836,578 | 6/1989 | Soltis | 324/208 |
| 4,865,799 | 9/1989 | Sadr | 264/526 |
| 4,923,667 | 5/1990 | Sayer | 264/572 |
| 4,944,910 | 7/1990 | Hendry | 425/812 |
| 5,044,924 | 9/1991 | Loren | 425/542 |
| 5,059,112 | 10/1991 | Wieser | 425/546 |
| 5,069,858 | 12/1991 | Hendry | 425/812 |
| 5,069,859 | 12/1991 | Loren | 425/812 |
| 5,198,238 | 3/1993 | Baxi | 264/572 |

OTHER PUBLICATIONS

Shah, Suresh and Hlavaty, Dave, "Gas Injection Molding of Thermoplastic Composite Window Guidance Channel", SAE Technical Paper, Warrendale, Pa. Feb., 1991.

Primary Examiner—Jay H. Woo
Assistant Examiner—Joseph Leyson
Attorney, Agent, or Firm—George A. Grove

[57] ABSTRACT

A gas injector having a retractable nozzle with linear gas feed passage therethrough for a gas assist plastics injection molding machine. The injector interfaces with the injection molding tool and has a nozzle with a tip that, in a forward position, protrudes through a port therein leading into the tool cavity or a runner system leading into the cavity for gas injection during molding. The nozzle tip is connected by a nozzle body to a base that is operatively mounted in an actuator housing. The base is connected to an in-line gas routing extension of the nozzle that projects through the outer cover of the housing. The extension is coaxial with an internal spring that seats on the base and holds the nozzle tip in a gas injection position resisting the force of plastics injection pressure. The base connected nozzle is retracted by combined flux fields of an electromagnet and a permanent magnet mounted within the housing while compressively loading the spring enhancing gas release from the cavity tool separation and subsequent ejection of molded part. The electromagnet is then deenergized since the permanent magnet has a sufficient magnetic force field to hold the base and the attached nozzle in the retracted position. For return to the gas injection position, the electromagnet is again energized but with the current supplied thereto reversed so flux field of the electromagnet is reversed to negate flux field of the permanent magnet allowing the spring to return the nozzle to the forward position.

9 Claims, 4 Drawing Sheets

GAS INJECTOR WITH RETRACTABLE NOZZLE FOR ASSIST OF PLASTICS INJECTION MOLDING

FIELD OF THE INVENTION

This invention relates to injection molding of plastics into a hollow part, and more particularly, to a new and improved retractable nozzle gas injector for injecting pressurized gas into heated plastics melt supplied to a cavity or cavity runner system within a mold so that the plastics is displaced onto the pattern defined by the cavity and for subsequently exhausting the gas from the molded part. This invention further relates to a new and improved method of gas assist injection molding of hollow plastics parts.

DESCRIPTION OF RELATED ART

Prior to the present invention, numerous injection molding apparatuses have employed a first injector for injecting heated plastics molding material into a mold cavity and a second and separate injector for injecting a pressurized inert gas into the cavity. As the gas rapidly expands, it forces the hot plastics material into contact with the surface of the mold cavity so that a hollow article of plastics is formed profiling the wall of the cavity. After a period of cooling and solidification, the mold is opened and the molded part ejected. Examples of such equipment are disclosed in U.S. Pat. Nos. 4,740,150 and 4,923,667 respectively issued Apr. 26, 1988 and on May 8, 1990 to M. Sayer.

SUMMARY OF THE INVENTION

The present invention is of the general category of the molding apparatuses and methods of that disclosed in the above identified patents, but further, provides new and improved retractable gas injector constructions and to new and improved methods for gas assist injection molding of heated plastics. More specifically, the present invention is drawn to an advanced gas injector and injection method which are readily adaptable to a wide range of injection molding apparatuses.

The gas injector comprises a nozzle and housing assembly that can be readily secured to a mold half or "tool steel". The assembly includes a base and nozzle support mounted for limited axial travel within a housing of the assembly and has an extending neck-like retainer portion that connects to one end of an elongated body of the nozzle assembly. The nozzle assembly terminates in a conical gas delivery nozzle that is adapted to seat in a corresponding conical recess of an insert located at a predetermined position in the mold tool. The nozzle assembly is moved to a gas injection position in the housing by a spring which displaces the base and nozzle support across a clearance and is withdrawn to a retracted position by the combined force fields of a rare earth permanent magnet and by an electromagnet or coil whose field is controlled by the quantity and direction of delivery of electrical energy supplied thereto.

Nozzle position sensing is provided to (1) insure that the gas delivery nozzle is in a fully seated position prior to injection of the heated plastics material into the mold cavity or runner and prior to the injection of gas into the cavity, and (2) insure that the nozzle is fully retracted from the mold cavity to allow the mold to be opened and the molded part ejected without damaging the nozzle. This also insures that the gas is exhausted from the molded part.

In this invention, the gas is fed linearly through a nozzle extension in the housing providing new and improved space saving construction with advanced accessibility while eliminating the complexities and space requirements of angular gas feed of prior constructions. Accordingly, the prior side feed passages and fittings which may be at a 90° angle with respect to the nozzle assembly and their associated gas feed lines are replaced by a gas line fitting and feed passage in substantially straight alignment with the nozzle assembly and the delivery nozzle.

A ceramic heater is provided for the nozzle assembly to heat the nozzle to a high temperature, 550°–750° F. for example, to prevent clogging of the gas passage by the plastics material and insure that the passage is open for the feed of pressured gas therethrough, thereby optimizing injection molding output by extending time of nozzle use before cleaning or replacement is required.

This invention further provides a new and improved gas assist plastics injection molding apparatus and process utilizing: (1) spring means for moving and maintaining the gas injector nozzle assembly in its injection position, (2) separate first and second magnetic means for returning the gas injector nozzle assembly to a retracted positions after molding is completed while compressively loading the spring means, and (3) control means for controlling the magnetic fields of the magnetic means to allow the spring means to move the nozzle assembly back to the gas injection position for a subsequent molding operation.

This method and apparatus eliminates prior leaky and bulky hydraulic cylinders used for effecting gas nozzle movement and provides for sensing of nozzle position and insures that the nozzle is properly inserted into the mold cavity or other mold position for gas assist plastics injection molding.

This invention provides new and improved gas feed and nozzle positioning construction that eliminates prior hydraulic cylinders and potential hydraulic leaks and eliminates bulky hydraulic connections requiring enlarged openings therefor in the molding tool. More particularly, this invention features the in-line gas feed of nitrogen or other inert gas into a centralized axial gas passage through the nozzle assembly. This construction facilitates manual access to the gas injector and also eliminates the need to remove the whole nozzle assembly to connect or disconnect the gas line.

This invention also provides for better standardization of the nozzle assemblies. Due to the in-line gas feed of this invention, all nozzle assemblies may have a standard nozzle body and utilize nozzle body extensions of different lengths if needed for various locations in the tool. This is in contrast with the prior nozzle bodies with 90° gas feed which require a custom made nozzle body depending on the depth of the tool steel at particular locations.

The integral position sensing designed into the nozzle assembly accurately senses forward and reverse travel of the nozzle assembly. Among the benefits, this position sensing importantly prevents the injection molding machine from continuing a cycle and injecting plastics before the nozzle assembly has returned to its fully seated forward position.

These and other objects, features and advantages of this invention will become more apparent from the following drawings and detailed description in which:

DESCRIPTION OF PREFERRED EMBODIMENTS

Figure 1:
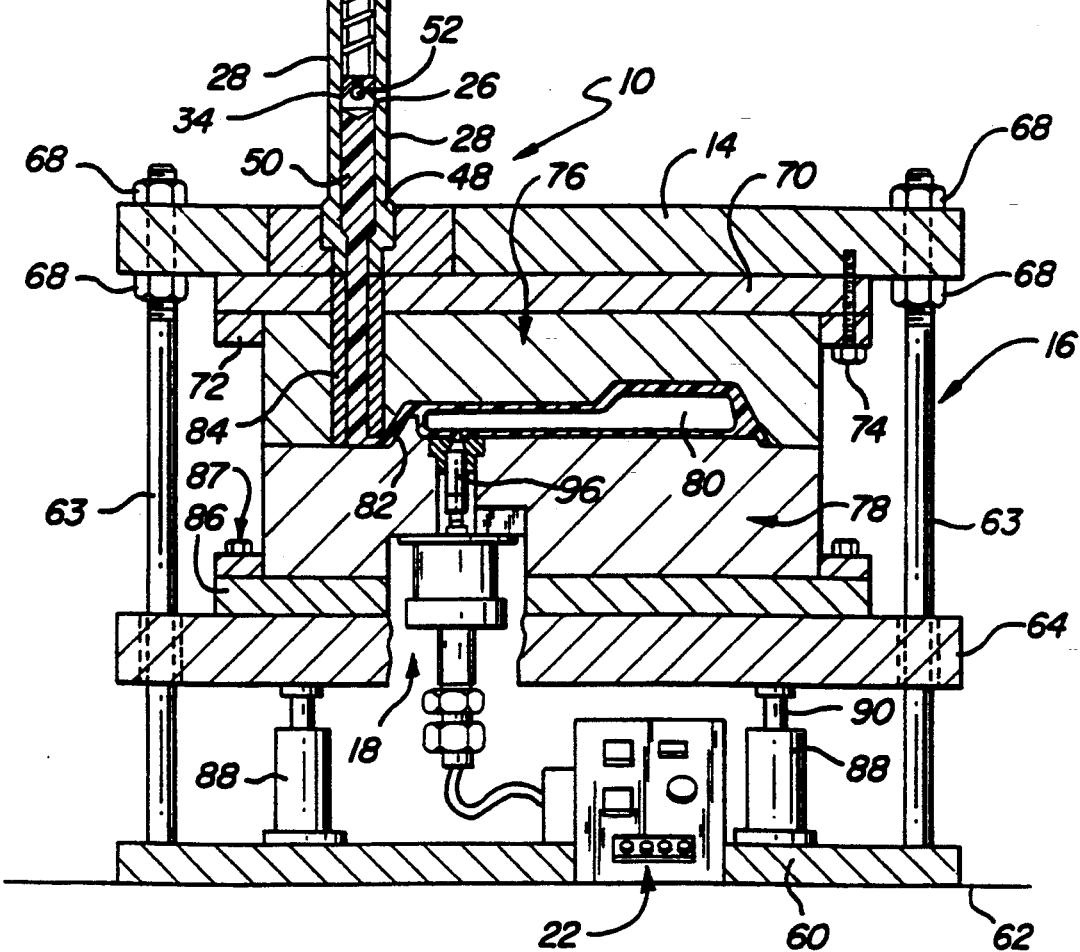
FIG. 1 is a diagrammatic view generally in cross section and partly broken away of a gas assisted plastics injection molding apparatus with separate plastics and gas injectors.

Turning now in greater detail to the drawings, there is shown in FIG. 1 a diagram of an injection molding machine 10 comprising a plastics injector unit 12 operatively connected to a fixed platen 14 of an injection mold assembly 16 and a gas injector 18 operatively mounted to tooling or mold half 78 of the mold assembly 16. Additionally, the molding machine includes controls in a control panel 22 for controlling the operation of the injection molding machine including operation of the plastics injector unit 12, the mold assembly 16 and the gas injector 18.

The plastics injector unit 12 is utilized to bring the polyester polycarbonite with glass fibers or other suitable hard structural plastics compound to a viscous state within a predetermined temperature and density range, and to homogenize the melt and then to inject a quantity of the melt under controlled pressure into the mold assembly 16. This unit includes a plasticating screw 24 operatively mounted in an elongated barrel 26 that is heated by a selectively energizable electric heater 28 surrounding the barrel 26. Pellets of the plastics material are fed into a hopper 30 that is connected to an injector housing 32 from which the barrel 26 extends. The screw 24 extends from a piston-like injector end 34 through the barrel 26 and housing 32 to a terminal end fastened to the inboard end of hydraulically actuated injection piston 36 that is mounted for rotation and linear stroking movement in a piston chamber provided by a cylinder 38 attached to the outboard end of housing 32. In addition to linear stroking movement, the piston can be selectively rotated by a hydraulic motor 40 secured to the outer end of the cylinder and operatively connected to controls of panel 22. The motor 38 has an elongated output shaft 42 that is spined at 44 to the inner wall of a pocket in the injection piston.

The barrel 26 has a passage therethrough that connects to a melt accumulator chamber 50 formed between the piston injector end 34 of the screw and an injector nozzle 48 at the end of the barrel, as shown. The injector end of the screw has a one-way valve therein, diagrammatically shown at 52, which allows the melt to be fed by the screw into the accumulation chamber but which blocks the return of the melt from the chamber to the screw on the stroking movement of the screw by the injection piston. The melt is fed into the mold assembly as a "short shot" that may be up to 70% of the total volume of the cavity by the axial movement of the screw 32 with the piston like injector end 34 of the screw forcing the melt into a feed passage in the mold.

The mold assembly 16 comprises a base plate 60 mounted to a support 62 having a plurality of tie rods 63 extending therefrom through bushings in a movable rectilinear platen 64. These tie rods are secured at their ends to the stationary platen 14 by threaded fasteners 68.

Mounted interiorly of the upper and stationary platen 14 by means of a retainer plate 70, retainer ring 72 and threaded fastener 74 is a first molding tool or "tool steel" 76 that in cooperation with a mating and lower molding tool 78 provides a profiled mold cavity 80. Cavity 80 is connected to the plastics injector 12 by a gate 82 and a cylindrical sprue bushing 84 provided in the first molding tool 76 that extends from the end of the gate to the nozzle of the injector, as illustrated in FIG. 1.

The lower or second mold tool 78 is mounted on a retainer plate 86 that is in turn secured by a support ring and threaded fasteners 87 to the platen 64, which is movably mounted on the tie rods by the controlled action of hydraulic cylinders 88. These cylinders are supported on the base plate 60 mounted on support 62 and have movable pistons therein with piston rods 90 contacting platen 64 for moving the platen on the tie rods for opening and closing the mold assembly. Controls in control panel 22 are selectively employed to feed, discharge and monitor pressure oil employed to open and close the mold assembly. Using such controls the mold tooling can be closed and the cavity supplied with a quantity of heated plastics material. After the part has been molded in the cavity, with gas assist as described below the mold is opened so that the molded part can be ejected with conventional ejector devices, now shown, associated with the tooling.

The gas injector 18 comprises a retractable, elongated nozzle assembly 96 that extends from connection with nozzle actuator mechanism 98 operatively mounted within a generally cylindrical housing 100 of the actuator mechanism. This housing has an end or base wall 102 which is secured within a recess 101 in tool 78 by a retainer ring 103 and threaded fasteners 105 and the base wall 102 is provided with an extending cylindrical neck 104 that fits within a cylindrical bore formed in the tool 78 that leads into mold cavity 80. The bore could lead into a runner system connected to the cavity 80 so that the term "cavity" as used in this specification includes runner systems or other feeds leading into cavity 80. The housing 100 also has a cylindrical side wall 106 extending from the base wall 102 that has an outboard end adapted to receive a rimmed cap 108 removably secured thereon by set screw 109 to define a chamber 110 that houses the actuator mechanism 98. The actuator mechanism is selectively operable to axially move the nozzle assembly 96 of the gas injector between a forward gas injection position (FIG. 2), and a retracted position (FIG. 3) in which gas is exhausted from the interior of the molded part.

Figure 2:
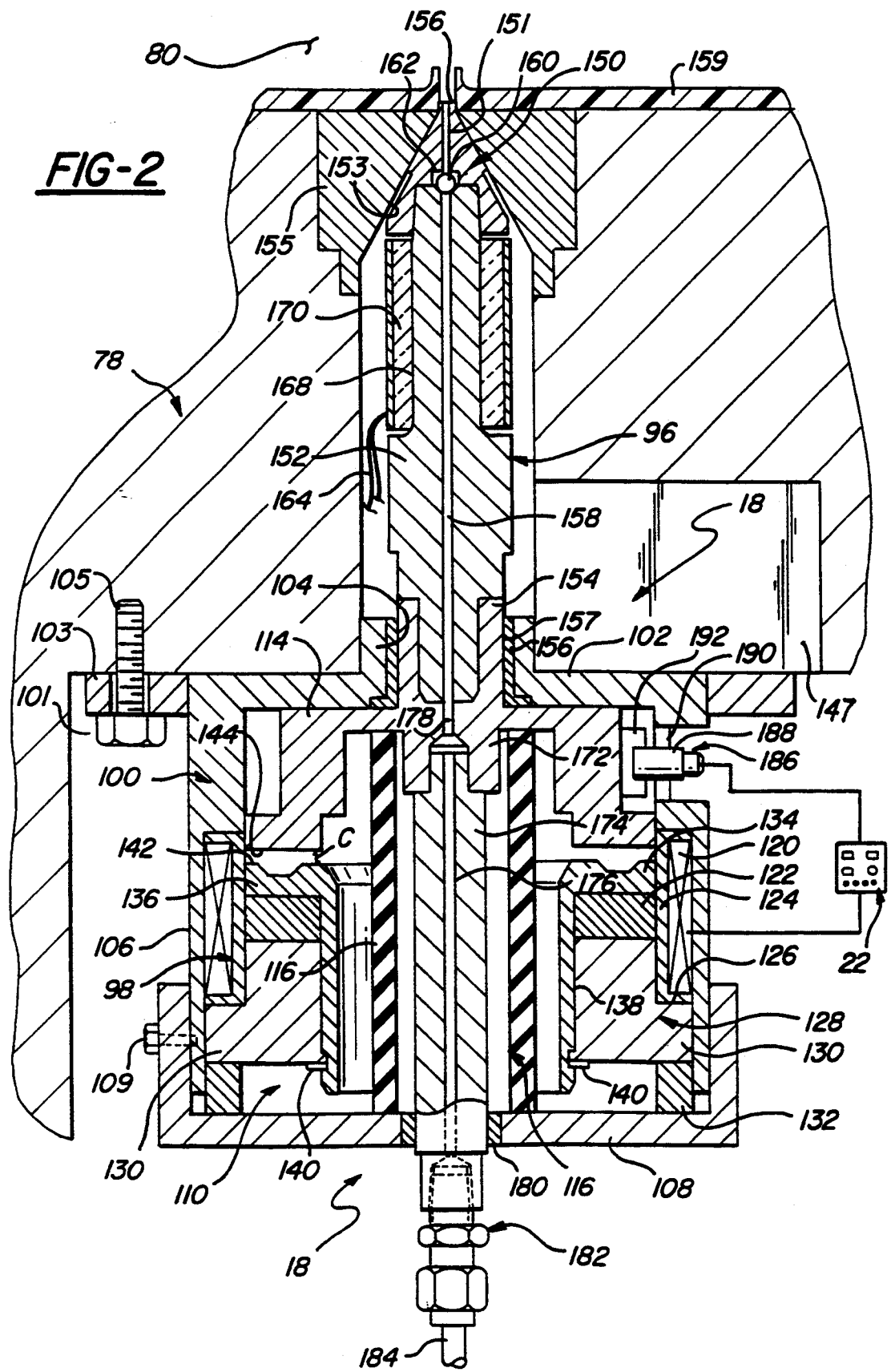
FIG. 2 is a cross-sectional view taken generally along sight lines 2—2 of FIG. 1 illustrating the gas injector in an gas injection position.
Figure 3:
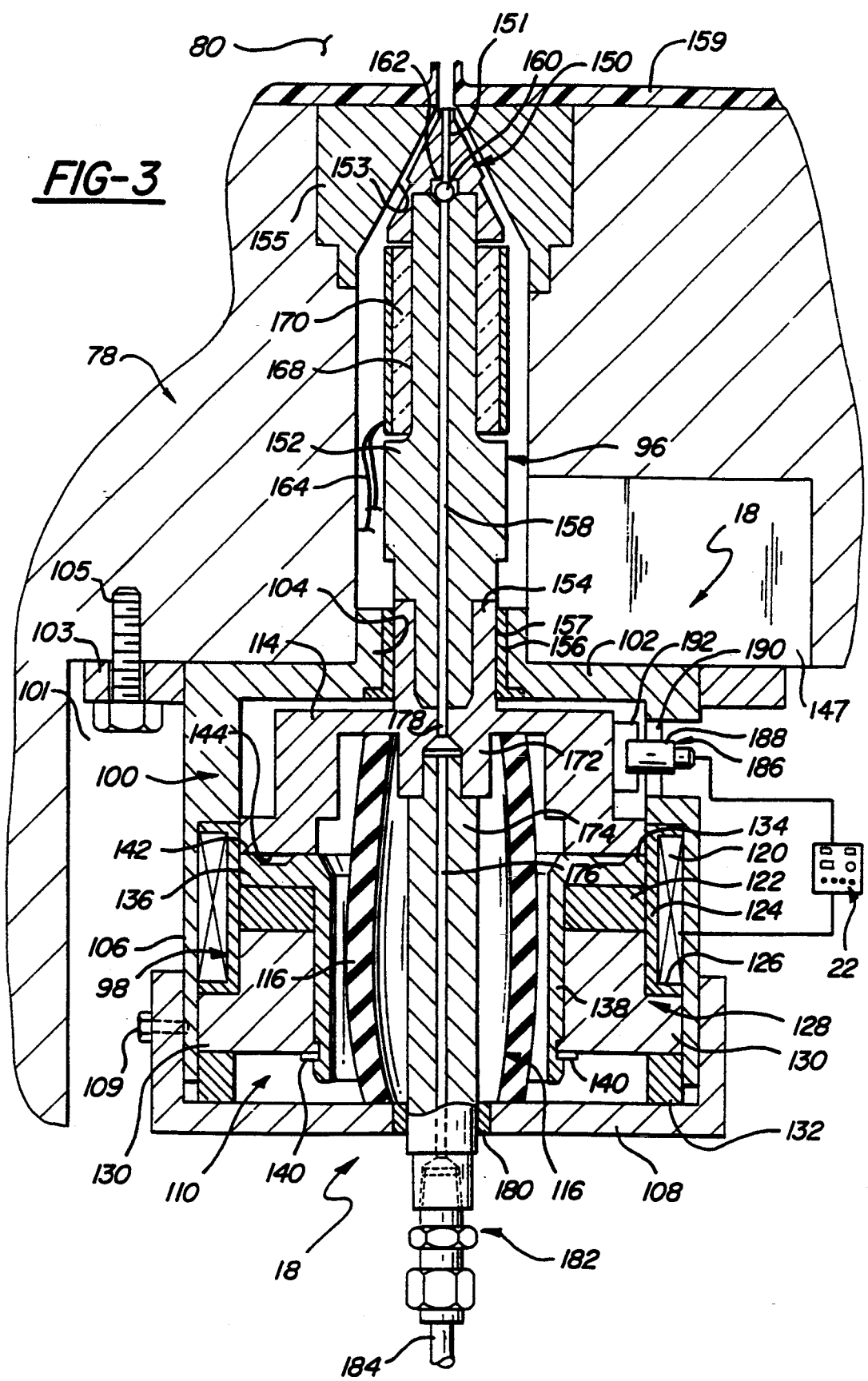
FIG. 3 is a view similar to that of FIG. 2 illustrating the gas injector in a retracted position.

The actuator mechanism includes a cup-like base 114 of steel that provides a seat for a spring 116 formed by a cylinder of resilient plastics material such as polyurethane, or by a helical spring of spring metal or of other suitable material such a fiber glass and resin material. The spring 116 provides the necessary force to hold the nozzle assembly 96 in its forward position against opposing forces including the plastics injection force until such retraction is required for part ejection. Such retraction is accomplished in the preferred embodiment of this invention by the combined magnetic fields of a selectively energizable coil 120 and a rare earth permanent magnet 122. The coil is a cylindrical unit having a bobbin 124 with one end supported on an annular internal shoulder of the housing and the opposite end seated on an annular shoulder 126 of a steel core 128. The steel core has a large diameter flange 130 trapped between the end of the bobbin and an annular spacer 132 of plastics material that in turn abuts against the removable cap 108, as shown in FIGS. 2 and 3.

The rare earth permanent magnet 122, which may be a "MAGNAQUENCH" magnet, is preferably cylindrical in shape and is positioned in the housing between the annular flange 134 of an iron or steel pole plate 136 and the adjacent surface of the core 128. The pole plate 136 has an elongated cylindrical body 138 extending from flange 134 and axially in the housing to an end which is short of the inner surface of the cap 108. An annular groove is formed adjacent the end of the core body for receiving a snap ring 140 that traps and retains the permanent magnet 122 to the steel core 128. The arrangement of the bobbin 124, flanged core 128 and the snap ring 140 importantly locates a contact surface 142 of the pole plate 136 at a predetermined distance from an adjacent contact surface 144 of the base. This spacing may, for example, be three millimeters or various other spacings suitable for gas injection and nozzle retraction.

The base 114 is yieldably held against the inner surface of the wall of the housing by the preload of cylindrical spring 116 which has one end seated on the base and the other end seated on the inner surface of the cap 108. Spring loads can be readily changed by the use of spacers having effective thicknesses different than the thickness of spacer 132. For example, the height of spacer can be reduced allowing the cap to be advanced on the cylindrical wall of the body to provide a greater preload to the spring 116 so that it exerts a larger spring force to the base and subsequently to the nozzle to resist the pressure that accompanies injection of plastics into the mold.

The nozzle assembly 96 includes a gas delivery nozzle 150 which is a conical unit that is adapted to seat in a conical recess 153 of an insert 155 fitted into a recess in the tool 78 that has an opening communicating with mold cavity 80. The delivery nozzle has an endmost extension 156 that in the forward position of the nozzle assembly projects to a position within the cavity 80. The nozzle 150 has a gas flow passage 151 therethrough for supplying gas to the cavity when the nozzle assembly is in the injection position. The force of the nitrogen gas pushes the heated plastics material as a wall 159 against the profile of cavity 80. Nozzle 150 has tapered axial recess therein that is secured to the end of an elongated nozzle body 152. The nozzle body 152 is connected at its other end to a neck-like cylindrical portion 154 extending axially from the base 104 through a bushing 157 providing an opening in the base allowing the nozzle assembly to be moved with reduced friction between the gas injection and retracted positions.

The nozzle body has an axial gas passage 158 therethrough which leads to a one-way ball check valve 160. This check valve is mounted at the outer end of the nozzle body 152 in a ball check valve chamber 162 formed in the delivery nozzle. With this arrangement, gas can be fed into the cavity 80 through the passage 158 and past the ball 160 and then through passage 151 in the nozzle. The ball check valve reactively seats to prevent any of the plastics material from flowing reversely into the gas feed passage 158.

The nozzle body has a reduced diameter shouldered portion 168 that provides a seat for a cylindrical ceramic heater 170, which when electrically energized by the conduction of an electrical current therethrough, heats the shoulder portion of the nozzle body and the nozzle 150 to a temperature sufficient to keep the nozzle free of plastics material so that maintenance is reduced and service life increased. This heater is energized by current through circuitry diagrammatically shown at 164 connected to the controls of panel 22.

The base 114 is formed with an inwardly extending annular neck 172 which receives and joins to the inner end of an elongated extension 174 that projects therefrom and through the end cap 108 as shown in FIGS. 2 and 3. This extension has an axial gas passage 176 therethrough that connects into the gas passage 158 in the nozzle body by the aligned gas passage 178 in the base. The extension is mounted to move with the base, and accordingly, the cap is provided with an annular bushing 180 to reduce friction and wear from such movement. The outer end of the extension is adapted to receive a connector 182 for a flexible gas line 184 which is connected to a source of pressurized gas.

With the in-line gas feed extending axially through the gas injector and through housing 100, there is improved access to the nozzle assembly. This construction reduces the need to remove the whole gas injector from the tooling to connect or disconnect the gas lines. Extension 174 can be of varying lengths to suit installation requirements in other locations or in different tooling. Importantly with this invention, the prior bulky and leak prone hydraulic power cylinders for moving the gas injectors are replaced by the internal magnetic devices and the seating spring, as described.

The gas delivered to the nozzle assembly may be selectively started, pressure regulated and stopped within a selected time range such as 2.5 to 30 seconds as required utilizing controls of panel 22.

To insure that the nozzle is properly seated in the insert 155 for sealing the cavity for plastics and gas injection purposes, the preferred embodiment of this invention employs a position sensor 186 operatively connected to the controls of panel 22.

The position sensor is an optical switch having a slotted body 188 supported by spokes 190 in an opening in the wall of housing 100. The body carries an infrared light emitting diode on one side of the slot and an NPN photo transistor on the opposite side. A blade like shutter 192 with spaced and aligned apertures therethrough for the passage of the infrared light beam is fixed to the base for linear movement therewith. This shutter fits in the slot of the position sensor 186 and moves relative to the infrared light transmitter and the opposing photo transistor so that the light passes through the shutter when the apertures align with the diode and transistor. With this sensing, the controls can effectively determine when the nozzle is fully seated and the appropriate time for injection of the heated plastics material, and to further indicate the position of the nozzle when moved for gas release, tool parting and part ejection purposes.

The nozzle assembly is moved to the retracted position of FIG. 3 by the combined flux fields of the permanent magnet 122 and the energized coil 120 which causes loading of the spring and the bulging thereof as diagrammatically illustrated in FIG. 3. At this time the clearance "C" between the base plate and the pole plate is taken up and their respective faces 144 and 142 contact one another as shown in FIG. 3. The current to the electromagnet is then terminated since the flux field of the permanent magnet is quite adequate to retain the base 114 and the nozzle in the retracted FIG. 3 position. This provides important energy savings and ensures that the gas injector does not become overheated by the current supplied to the coil of the electromagnet. During this movement, the pressure gas readily escapes from the molded part through the clearances between the nozzle and its seat and between the nozzle body and the recess in tool 78 and through a discharge slot diagrammatically shown at 147 in the tool 78.

For a molding operation, the nozzle assembly is moved from the retracted position of FIG. 3 into the cavity sealing and gas injection position of FIG. 2. This is readily accomplished by reversing the supply of electric current so that the direction of the flux field of the coil effectively negates the flux field of the permanent magnet holding the base 114 and the nozzle in the retracted position. The spring under high compression load, accordingly, strokes the base and the nozzle assembly to the gas injection position.

With the nozzle assembly in the gas injection position and with heated plastics material supplied to the mold cavity, pressurized gas is again fed through the axial passage 158 into the interior of the heated plastics material to force the material to form as a hollow walled unit which interfaces with the cavity to form the profile thereof.

After this injection and gas charging, the coil is energized so that its field again combines with the field of the permanent magnet to again attract the base across the clearance between the base and the pole. While as indicated above, this may involve only a distance of three millimeters. The travel is sufficient to clear the nozzle from the interface mold tooling so that the mold tooling can be readily separated and the formed plastics part can be easily ejected from the tooling.

During this retraction, the inert gas fed into the interior of the mold will return through the passage between the nozzle body and the opening in the tool therefor. As shown in FIG. 3, this retraction again causes the spring 116 to receive the retraction load and deflect from the cylindrical form to a barrel shaped configuration. At this time the position sensor has determined that the nozzle is in its fully retracted position so that the coil is then deenergized by the controls and the base is held solely by the force field of the permanent magnet. This advantageously reduces the consumption of electrical energy and prevents the heat build-up in the body of the gas injector unit. In a subsequent molding procedure, the current feed to the coil is reversed so that its magnetic field again cancels the field of the permanent magnet and the spring 116 again returns to its FIG. 2 position in which the nozzle is nested in the gas injection position.

Figure 4:
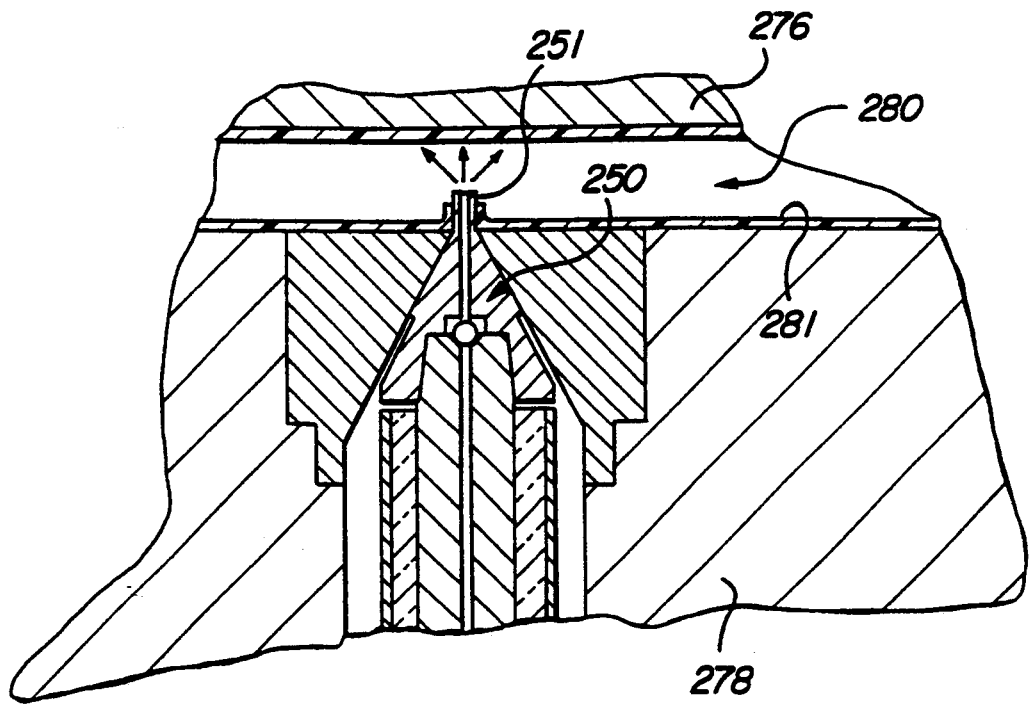
FIG. 4 is an enlarged sectional view of a portion of gas injector and associated tooling similar to that of FIGS. 2 and 3 but modified to illustrate a gas injector nozzle with an end that terminates at a centralized station in a cavity or runner of the mold tooling when the injector is in a gas injection position.

FIG. 4 illustrates another preferred embodiment of this invention that basically involves a variation of the configuration of the gas delivery nozzle of FIGS. 2 and 3. More particularly, in FIG. 4 the nozzle 250 has a tip 251 that extends to a centralized point into the cavity 280 provided by the separable mold halves 276 and 278 of the mold tooling when the gas injector is in the extending gas injection position. In this nozzle position the tip 251 will be positioned in a high viscosity area of the melt so that the gas discharged therefrom will force the high temperature interior portion of the melt to flow with reduced turbulence and the melt will form as a wall 281 of a substantially constant thickness against the surfaces of the mold halves that define the cavity 280. The actuator mechanism for stroking the nozzle assembly is designed with sufficient stroke to move the nozzle tip between the gas inject position and a withdrawn position in which the tip is completely clear of the parting line of the mold halves.

Figure 5:
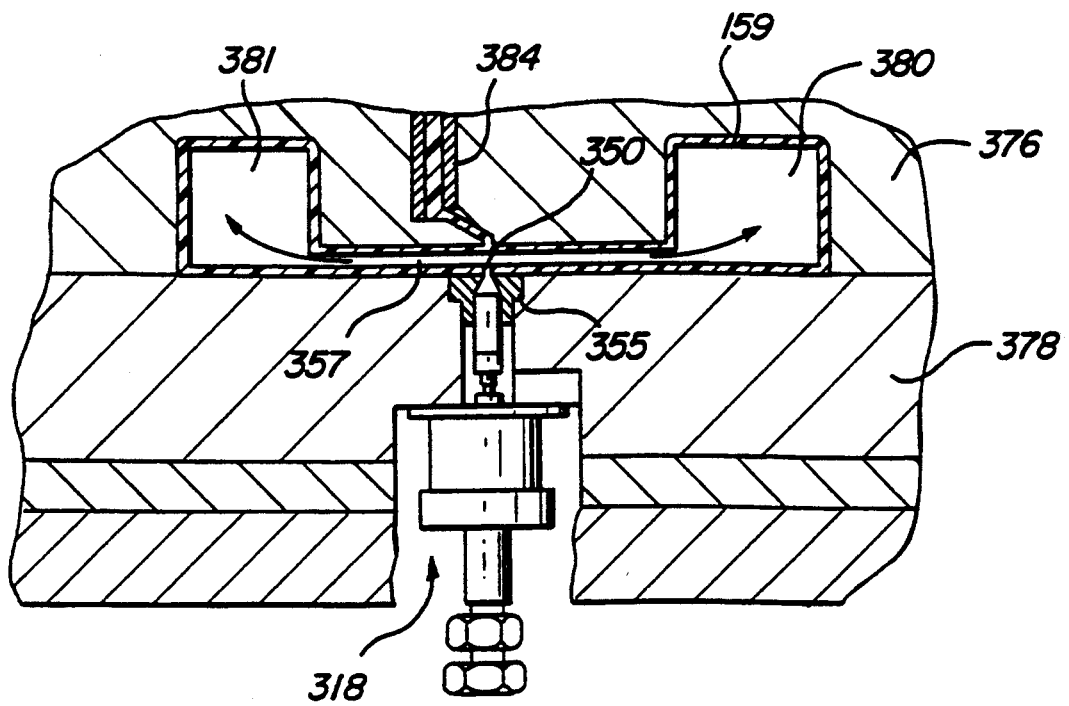
FIG. 5 is a diagrammatic view generally in cross section of a portion of a gas assisted plastics injection molding apparatus similar to that of FIG. 1 but with gas assist introduced into a runner leading into a pair of cavities within mold tooling.

FIG. 5 illustrates the gas injector 318, which is the same as the gas injector of FIGS. 1–3 or that of FIG. 4, with a nozzle 350 movably positioned on a seat 355 that opens into a runner 357 in the mold tooling 376, 378. The runner 357 leads into a pair of cavities 380 and 381. The runner 357 is fed with a short shot of plastics melt from a plastics injector through a sprue 384 and the pressurized gas fed into the runner forces the melt to form as a wall against the surfaces of the cavities as well as the runners leading thereto. Accordingly in this invention, the term "cavity" refers to the plastics melt receiving recess provided by the mold tooling including the runners and cavities such a described an shown in FIGS. 1 through 5.

While preferred embodiments of the invention has been shown and described, other embodiments following therefrom will now become apparent to those skilled in the art. Accordingly, this invention is not to be limited to that which is shown and described but by the following claims.

What is claimed is:

1. A gas injector for feeding pressurized gas to assist the plastics injection molding of a part in a cavity of a mold in which heated viscous plastics material is supplied thereto, the pressurized gas forcing the plastics material into a hollow molded part conforming to the contours of the cavity of the mold, said mold having an opening therein leading from an outer surface thereof to the cavity therein for receiving at least part of said gas injector, said mold having a seat surface defining a portion of said opening, said injector comprising a housing having an inner end wall adapted to be secured in a fixed position on said mold and having a side wall extending from said end wall and having an outer end cap to define a chamber, said gas injector having base means mounted for linear movement between first and second positions in said chamber, an elongated gas injector nozzle body affixed for movement with said base means and extending through an opening in the inner end wall, into the opening in said mold, and toward said cavity, said nozzle body terminating in a nozzle attachment end, a gas delivery nozzle having an exterior surface, said gas delivery nozzle secured to said attachment end of said nozzle body and movable therewith between a gas injection position wherein said exterior surface mates with said seat surface when said base means is in said first position for feeding pressurized gas into said cavity and a gas exhaust position away from said cavity wherein said exterior surface is spaced from said seat surface to establish a gas exhaust passage extending around the exterior surface of said nozzle and through the opening in said mold to exhaust gas from said cavity when said base means is in said second position, spring means of a first height operatively mounted in said housing for forcing said base means into said first position and magnetic means mounted within said housing, said magnetic means including a permanent magnet and electrically energizable coil means selectively energizable with electrical current flow therethrough in a first direction to produce a magnetic force field which combines with a magnetic force field of the permanent magnet to move said base means from said first position to said second position to compressively load and deflect said spring means to a second height less than said first height while moving said nozzle from said gas injection position to said gas exhaust position in which gas is exhausted from said cavity through said gas exhaust passage, and internal gas feed passage means extending through said housing and said base means and said nozzle body and said nozzle for feeding a pressure gas into said mold through said gas delivery nozzle when in said gas injection position, said coil means being further selectively energizable with electrical current flow therethrough in a second direction opposite to said first direction to produce a magnetic force field to negate the magnetic force field of said permanent magnet so that said spring means recovers to said first height to move said nozzle to said gas injection position.

2. The gas injector of claim 1 wherein said end cap is mounted on said side wall and is spaced from said inner end wall, said base means having a nozzle extension connected thereto and projecting therefrom through an opening in said end cap, said gas feed passage means extending generally linearly through said extension and said base means and through said nozzle body and said nozzle for supplying pressurized gas to the cavity through said gas delivery nozzle.

3. The gas injector of claim 1 wherein said force field of said permanent magnet is sufficient to retain said base means in said second position upon the electrical deenergization of said coil means.

4. The gas injector of claim 2 and further including control means for selectively delivering electrical current to said coil means in said first direction or in said second direction and wherein said spring means comprises a cylindrical sleeve to elastomer disposed in said housing around said extension between said base means and said end cap.

5. The gas injector of claim 4 and further including position sensor means having a sensor body operatively secured to said housing and having shutter means cooperating with said sensor body so that said sensor means is effective to sense the position of said gas delivery nozzle when moved to said gas injection position so that pressure gas can be timely injected into said mold for forcing a layer of the heated plastics onto the limits of the cavity in said mold to form the molded part and for subsequently sensing the position of the delivery nozzle when moved from said gas injecting position to said gas exhaust position so that the mold can be opened and the molded part can be ejected from the mold.

6. An injector for injecting a pressurized gas into a mold having a cavity into which a quantity of heated plastics material has been supplied and having an opening therethrough leading into said cavity for receiving a portion of said injector, said mold having a seat surface defining a portion of said opening, said injector comprising a gas delivery nozzle extending into said opening, said nozzle having an exterior surface and having a gas passage therethrough for directing pressurized gas into said cavity in said mold for the gas assist of plastics injection molding of a part therein, a nozzle body having a first end portion secured to said delivery nozzle and having a second end portion, a housing adapted to be secured to said mold having forward and rear walls and a side wall extending between the forward and rear walls to define a chamber, a base member mounted for linear stroking movement between withdrawn and extended positions in said chamber, connector means extending through said forward wall for connecting said base member to said second end portion of said nozzle body, an extension connected to said base member and extending therefrom through the rear wall of said housing, gas delivery passage means extending through said nozzle body and said base member and said extension for conducting pressurized gas to said gas passage in said nozzle, one-way valve means in said gas passage means adapted to open to allow the flow of gas through said gas passage means into said cavity and adapted to close to block the flow of gas through said gas passage means from the cavity, said nozzle being movable to a gas delivery position wherein said exterior surface mates with said seat surface when said base member is in said extended position and movable to a gas exhaust position when said base member is in sale withdrawn position wherein said exterior surface is spaced from said seat surface to form gas exhaust passage means provided by said opening extending around the exterior surface of said nozzle, axially spaced first and second stop means in said housing to respectively establish said withdrawn and extended positions therein for said base member and thereby respectively establish the gas exhaust and the gas delivery positions of said nozzle body and said delivery nozzle with respect to said cavity, first actuator spring means operatively mounted in said housing for directly exerting a spring force on said base member for urging said base member to contact said second stop means so that pressurized gas can be supplied to said cavity through said nozzle, separate first and second magnetic means operatively mounted within said housing and operative for moving said base member from said second stop means to said first stop means to compressively load said spring means so that gas can be exhausted from said cavity through said gas exhaust passage means, and said first magnetic means being a selectively energizable electromagnetic means which is deactivated after said base member has moved to engage said first stop means, said electromagnetic means being selectively energizable to strengthen or to negate the flux field of the second magnetic means.

7. The injector of claim 6, wherein said second magnetic means is a permanent rare earth magnet having a flux field sufficient to hold said base member in contact with first stop means subsequent to the deactivation of said electromagnetic means.

8. An injector for injecting molding assist gas into a plastics injection mold and movable in a bore in the mold to a gas injection position wherein said injector is in sealing engagement with a seat in said bore for injecting gas into a cavity of said mold after a melt of plastics material has been injected therein for forcing the melt onto wall means defining the cavity so that the plastics material can solidify into a part having an external shape profiling the wall means defining the cavity and movable from the seat to a retracted position to establish a gas exhaust passage for said cavity extending through said bore and around the exterior of said injector to the exterior of said mold, said injector comprising:
  a. an elongated nozzle assembly having a gas injection nozzle with an exterior surface and having an internal gas supply passage therein,
  b. a housing adapted to be attached to said mold,
  c. a base connected through said housing to one end of said nozzle assembly and mounted for limited movement in said housing between a first position wherein said exterior surface sealingly engages the seat and a second position wherein the gas exhaust passage is established,
  d. spring means operatively mounted in said housing for holding said base and said nozzle assembly in said first position,
  e. first and second magnet means operatively mounted within said housing for moving said base in said housing to said second position while compressively loading said spring means, and
  f. means for changing the magnetic field of the first magnet means to effectively negate the magnetic field of the second magnet means so that said spring means can move said base and said nozzle assembly back to said gas injection position.

9. A gas injector assembly for supplying gas into a quantity of heated plastics material fed into a mold cavity of a multi-part mold having an opening therein for receiving at least a portion of said injector assembly to force the plastics material into a layer generally conforming to the contours of the cavity of the mold, said gas injector assembly comprising a nozzle body extending into said opening in said mold and having inboard and outboard ends, housing means including a base wall with an opening therethrough for receiving said nozzle body, a gas delivery nozzle secured to said inboard end of said body for injecting gas into the mold cavity when in a gas injection position, said housing having side wall means extending from said base wall and a closure affixed thereto spaced from said base wall to define a chamber therein, a base member movably mounted in said chamber and secured to the outboard end of said nozzle body, an extension secured to said base member and extending through an opening in said closure, spring means operatively mounted in the housing for axially moving said base member into a first position so that said gas delivery nozzle is in the gas injection position wherein a portion of the nozzle extends into the cavity, magnetic means comprising a permanent magnet and a selectively energizable electromagnet mounted internally in said housing for producing magnetic fields for axially moving same base member from said first position to a second position when said electromagnet is energized whereby said portion of said gas delivery nozzle is moved out of said cavity, and gas feed passage means extending in a generally linear path completely through said extension and said base member and said nozzle body and said nozzle for conducting a pressure gas into said cavity when said gas delivery nozzle is in said gas injection position and gas feed line connector means secured to the outer end of said extension substantially in line with the gas feed passage means.

* * * * *